(12) United States Patent
Villa Pulido et al.

(10) Patent No.: US 12,355,030 B2
(45) Date of Patent: Jul. 8, 2025

(54) HIGH IONIC CONDUCTIVITY COMPOSITE LiLaZrBiO GARNET—POLYMER ELECTROLYTE

(71) Applicants: Purdue Research Foundation, West Lafayette, IN (US); Andres Villa Pulido, Santa Fe, NM (US); Esteban Marinero-Caceres, West Lafayette, IN (US); Muhammed Oduncu, Lafayette, IN (US)

(72) Inventors: Andres Villa Pulido, Santa Fe, NM (US); Esteban Marinero-Caceres, West Lafayette, IN (US); Muhammed Oduncu, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 600 days.

(21) Appl. No.: 17/617,570

(22) PCT Filed: Jun. 5, 2020

(86) PCT No.: PCT/US2020/036282
§ 371 (c)(1),
(2) Date: Dec. 8, 2021

(87) PCT Pub. No.: WO2020/251844
PCT Pub. Date: Dec. 17, 2020

(65) Prior Publication Data
US 2022/0238907 A1    Jul. 28, 2022

Related U.S. Application Data

(60) Provisional application No. 62/859,408, filed on Jun. 10, 2019.

(51) Int. Cl.
*H01M 10/056* (2010.01)
*C01G 29/00* (2006.01)
*H01M 10/0525* (2010.01)

(52) U.S. Cl.
CPC ........ *H01M 10/056* (2013.01); *C01G 29/006* (2013.01); *H01M 10/0525* (2013.01);
(Continued)

(58) Field of Classification Search
None
See application file for complete search history.

(56) References Cited

U.S. PATENT DOCUMENTS

2010/0209769 A1*  8/2010  Hamada .............. H01M 50/529
                                                                   429/185
2012/0196189 A1    8/2012  Babic et al.
(Continued)

FOREIGN PATENT DOCUMENTS

KR            101886358 B1 *  8/2018

OTHER PUBLICATIONS

KR101886358B1 English machine translation (Year: 2018).*
(Continued)

*Primary Examiner* — Scott J. Chmielecki
(74) *Attorney, Agent, or Firm* — Brannon Sowers & Cracraft PC

(57) ABSTRACT

A method of controlling the ionic conductivity of a polymer member, including providing a plurality of particles of bi-doped garnet, dispersing the plurality of particles of bi-doped garnet in a PEO matrix to yield a polymer member, nucleating spherulites at bi-doped garnet particle sites, and growing spherulites to a critical density to provide ionic conductivity pathways throughout the polymer member.

23 Claims, 15 Drawing Sheets

(52) U.S. Cl.
CPC ...... *C01P 2002/54* (2013.01); *C01P 2002/72* (2013.01); *C01P 2004/62* (2013.01); *H01M 2300/0077* (2013.01); *H01M 2300/0082* (2013.01); *H01M 2300/0091* (2013.01)

(56) References Cited

U.S. PATENT DOCUMENTS

| | | | | |
|---|---|---|---|---|
| 2016/0133990 | A1* | 5/2016 | Schwanz | H01M 10/0562 429/189 |
| 2017/0338522 | A1 | 11/2017 | Hu et al. | |
| 2018/0254523 | A1* | 9/2018 | Ahn | H01M 10/056 |
| 2018/0342761 | A1 | 11/2018 | Eaglesham et al. | |
| 2019/0027724 | A1* | 1/2019 | Xing | H01M 10/0562 |

OTHER PUBLICATIONS

Wagner, et al., Synthesis, Crystal Structure, and Stability of Cubic Li7—xLa3Zr2—xBixO12 (Year: 2016).*
Schwanz, et al., Ionic conductivity enhancements and low temperature synthesis of Li7La3Zr2O12 garnets by Bi aliovalent substitutions (Year: 2019).*
Kireeva, et al., Materials space of solid-state electrolytes: unraveling chemical composition-structure-ionic conductivity relationships in garnet-type metal oxides using cheminformatics virtual screening (Year: 2017).*
Wang, et al., Dramatic reduction in the densification temperature of garnet-type solid electrolytes (Year: 2018).*
Buvana, P., Vishista, K., Shanmukaraj, D. et al. Lithium garnet oxide dispersed polymer composite membrane for rechargeable lithium batteries. Ionics 23, 541 548 (2017).
Oduncu, Muhammed Ramazan, "Development of a novel polymer-garnet solid state composite electrolyte incorporating Li—La—Zr—Bi—O and polyethylene oxide" (2016). Open Access Theses. 978. https://docs.lib.purdue.edu/open_access_theses/978.
The International Bureau of WIPO, International Preliminary Report on Patentability, PCT/US2020/036282, dated Dec. 14, 2021.
International Searching Authority, PCT Search Report and Written Opinion; PCT/US2020/036282, dated: Sep. 2, 2020.

* cited by examiner

HIGH IONIC CONDUCTIVITY COMPOSITE LiLaZrBiO GARNET—POLYMER ELECTROLYTE

CROSS-REFERENCE TO RELATED APPLICATIONS

This patent application claims priority to U.S. Patent Provisional Application Ser. No. 62/859,408, filed on Jun. 10, 2019.

TECHNICAL FIELD

The present disclosure relates generally to the field of energy storage and, more particularly, to a non-flammable and mechanically flexible solid-state electrolyte material.

BACKGROUND

Lithium based battery systems are a clean and effective way to transport energy in our increasingly energy dependent society. With increasing demands for more power, much research is going into new cell architectures and chemistries, consequently increasing demands for stability, cyclability and safety. As an integral component of the battery, electrolytes lie at the crossroads of these ever-increasing needs. Conventional liquid electrolyte-salt combinations often result in safety issues and cell degradation due to inherent flaws such as dendritic growth and thermal runaway. In some well-publicized instances, such thermal runaway can result in fire and/or explosions of the lithium ion batteries powering cell phones, hoverboards, and like devices. Solid state electrolytes bring increased functionality to the cell in terms of increased stability and safety. However, in general, ionic transport through solid electrolyte materials is orders of magnitude lower than that through liquid electrolytes. If the ionic conductivity mechanisms and the fabrication of solid-state electrolyte materials capable of conducting Li-ions can be optimized, battery safety, lifetime and capacity can be improved significantly.

Thus, there remains a need for an improved Li-ion battery electrolyte system. The present novel technology addresses this need.

DETAILED DESCRIPTION

Figure 1:
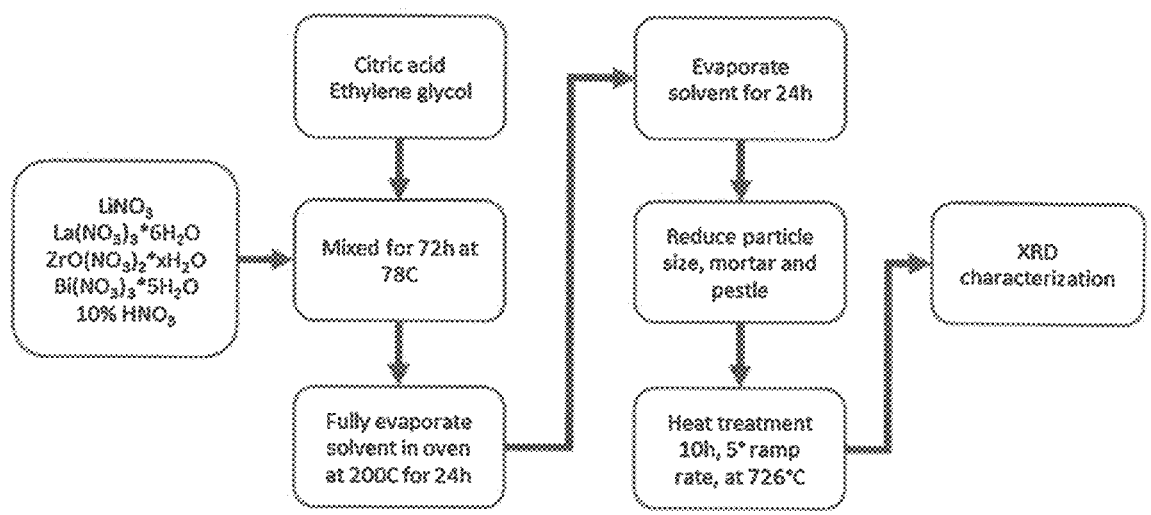
FIG. 1 schematically illustrates a process of the synthesis of LLZBO garnets.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Overview

The instant novel technology relates to a composite ceramic-polymer solid-state electrolyte for lithium-ion batteries including cubic phase, bismuth-doped lithium lanthanum zirconium oxide (generally denoted LLZBO) meso-particles embedded in a poly (ethylene oxide) (PEO) or like membrane. The sol-gel Pechini method was used to fabricate single cubic phase LLZBO at a low temperature of about 700° C. for this complex oxide. The particle size and weight percentages of LLZBO in PEO were found to influence the ionic conductivity of the composite electrolyte, with a relatively high ionic conductivity obtained at 5 weight percent, with a value of $1.09 \times 10^{-4}$ S/cm at 35° C. and $5.45 \times 10^{-3}$ S/cm at 55° C. While the LLZBO particles are typically mesoparticles (particle size between 100 and 1000 nm), the particle size may range from 1 nm to 500 microns.

The high values of the ionic conductivity measured in these composites at lower weight percentages likely arise from a combination of factors that include small average particle size, the cubic nature of the LLZBO powder and a higher polymer amorphous fraction surrounding the aliovalently-doped LLZO (typically LiLaZrBiO and more typically $Li_6La_3ZrBiO_{12}$ or Bi-LLZO) meso-particles. While the dopant focused upon herein is Bi, the dopant may be selected from the group including Ga, Ta, W, Al, Bi, Nb, Nd, Co, Fe, and combinations thereof. This is supported by the microstructural analysis here reported and by the physical mechanisms of the ionic conductivity likely occurring in composite polymer solid-state electrolytes. This material paves the way for safe, non-flammable, and mechanically flexible solid-state electrolytes for lithium ion battery applications.

Lithium-ion batteries are energy storage systems used for a wide variety of electric devices and vehicles. For high power devices, like automobiles, high ionic conductivity of the electrolyte is preferred. The electrolytes commonly used in lithium ion batteries are flammable organic electrolytes, which hinder their wider implementation in transportation. Several options have been investigated to replace the liquid electrolytes, such as ionic liquids, solid polymer electrolytes, solid state electrolytes, and gel polymer electrolytes. Solid state electrolytes (SSE) with high ionic conductivity at room temperature are of particular interest in current battery research. Additional SSE advantages are wider electrochemical stability voltage window, higher thermal stability and transference numbers approaching 1.0 vs<0.5 for other electrolytes.

A particular SSE of interest is lithium lanthanum zirconium oxide (LLZO). This garnet material is known to exhibit good ionic conductivity (IC) and chemical stability for use in lithium ion batteries, with IC values as high as $3 \times 10^{-4}$ S/cm at 25° C. However, high synthesis and annealing temperatures are needed to attain these values. The range of synthesis temperatures employed ranged from 1100° C. to 900° C. LLZO stabilizes both tetragonal and a cubic morphologies, with the cubic phase exhibiting values of IC up to two orders of magnitude higher that the tetragonal polymorph. This large difference in ionic conductivity is attributed to a slight reduction in lattice spacing between Li sites of the garnet structure for the case of the cubic polymorph, resulting in a lower energy barrier for lithium ion vacancy hopping.

Cubic LLZO has been doped with a variety of elements, and its effect on ionic conductivity known. For example, at 25° C., IC values of $6.6 \times 10^{-4}$ S/cm for W doping, $2.1 \times 10^{-4}$ S/cm for Al doping and a value of $2.56 \times 10^{-4}$ S/cm at room temperature was reported for Ru doping. The synthesis temperature of the cubic phase of LLZO has also been reduced down to 705° C. by employing the Pechini sol-gel method. This method also allows for a highly controlled stoichiometry of the complex oxide garnet.

Solid polymer electrolytes have also been investigated as potential replacements for liquid electrolytes. Although offering several advantages, such as flexibility and high mechanical strength, they exhibit low ionic conductivities at room temperature. Improvements are obtained by adding filler particles, such as alumina, magnesia, and LLZO to the PEO substrate, which decrease the extent of crystallinity in the polymer matrix and thus incrementally increase ionic conductivity.

This hybrid materials are referred to as composite polymer electrolytes (CPE) or polymer composite electrolytes (PCE). The fillers can be passive or active, and they can improve the ionic conductivity by orders of magnitude. The difference between passive and active fillers is that the passive fillers do not directly participate in the Li ion transport process. Examples of passive fillers used are $Al_2O_3$, MgO, and some active fillers, include lithium titanium aluminum phosphate ($Li_{1.3}Ti_{1.7}Al_{1.3}(PO_4)_3$ or LTAP), and LLZO.

Adding fillers to a polymer matrix has the effect of decreasing the extent of crystalline regions in the matrix, thereby allowing for higher ionic conductivity values. Ionic conductivity in said polymer-ceramic systems is ascribed to lithium ion transport in three distinct regions: the ceramic particle, the polymer matrix, and an interface region of a certain length scale where the degree of polymer crystallinity is influenced by the presence of the filler particle when compared to the rest of the polymer volume. Furthermore, the ionic conductivity is reported to increment by decreasing the average particle size of the passive or active fillers.

Doping LLZO, general formula $Li_{7-x}La_3Zr_{2-x}Bi_xO_{12}$ with x being allowed to range from 0.01 to 1.99, with bismuth allows for the formation of the cubic phase at lower temperatures, as well as increasing the degree of densification when sintering the powders. The amount of bismuth doping increases the ionic conductivity of the garnet, reaching an optimum amount and then decreasing in value. The highest IC value at 27° C. was obtained for x=0.75, reporting $2 \times 10^{-4}$ S/cm. The value for x=1 at the same temperature was $1.2 \times 10^{-5}$ S/cm. These measurements were obtained in pellets not fully densified and at a calcination temperature of 900° C. for 10 h. This compares well with traditional methods employing annealing temperatures of 1230° C. for 36 hours and ball milling to synthesize LLZO.

With LLZBO incorporation into a $PEO:LiClO_4$ matrix, the effect of LLZBO average particle size reduction, as well as the polymer to salt ratio, on the solid state electrolyte ionic conductivity, is observed. An optimum polymer/salt weight ratio of 7.5 to 1 was obtained, and IC was observed to increment as the average LLZBO particle size was reduced. However, any suitable polymer to salt ration may be selected from abut 3:1 to about 15:1.

Cubic-phase bismuth-doped lithium lanthanum zirconium oxide ($Li_6La_3ZrBiO_{12}$) was synthesized using the Pechini sol-gel method and low-temperature calcination. The cubic nature of the LLZBO powder was verified by XRD and after ball milling, and the LLZBO is added to a PEO:LiTFSI matrix. This PCE was cast and dried over a period of 5 days, and its IC measured by electrochemical impedance spectroscopy (EIS). The effect of different weight loads of LLZBO in the PEO:LiTFSI matrix on IC over a range of temperatures was observed. FTIR is also used to characterize the different PCEs. A mechanism for IC improvements is discussed below.

Example

Bismuth-doped lithium lanthanum zirconium oxide, LLZBO ($Li_{7-x}La_3Zr_{2-x}Bi_xO_{12}$) was produced via a solution-based citrate-gel Pechini method. $LiNO_3$, $ZrO(NO_3)_2 \cdot xH_2O$, $Bi(NO_3)_3 \cdot 5H_2O$ and $La(NO_3)_3 \cdot 6H_2O$ were dissolved in diluted nitric acid. Citric acid was added as a chelating agent and ethylene glycol was added as complexing agent. A metallic ion to organic ratio of 25:75 was chosen to allow enough organic material to polymerize compared to the amount of metal cations. A citric acid to ethylene glycol ratio of 40:60 was used. This ratio was chosen to avoid auto-ignition of the polymerized complex during heat treatment. The globe beaker was put on a sand bath to control the mixture's temperature at 78° C. to avoid precipitation of any precursor powders.

Sol-gel reactions for LLZO synthesis are less energy intensive and are faster than solid-state reactions. A 72-hour mixing period was chosen to allow full reaction completion and to obtain high purity of LLZBO.

The mixture was subsequently moved to a cylindrical beaker and held at 78° C. for 24 hours to evaporate the nitric acid. Finally, the mixture was transported to an oven and heated up to 200° C. for 24 hours to fully evaporate all acid, yielding a brown solid powder. The powder was then milled with mortar and pestle and the resulting material was filtered out with a 150 μm sieve to eliminate excessively large fragments. This powder was then calcined at 701° C. in a high-temperature furnace for 10 hours. The resulting powder has a whitish-yellow color. The microstructure of the LLZBO powder was then confirmed to be cubic by XRD. FIG. 1 provides a flow chart of the LLZBO synthesis method.

Figure 2:
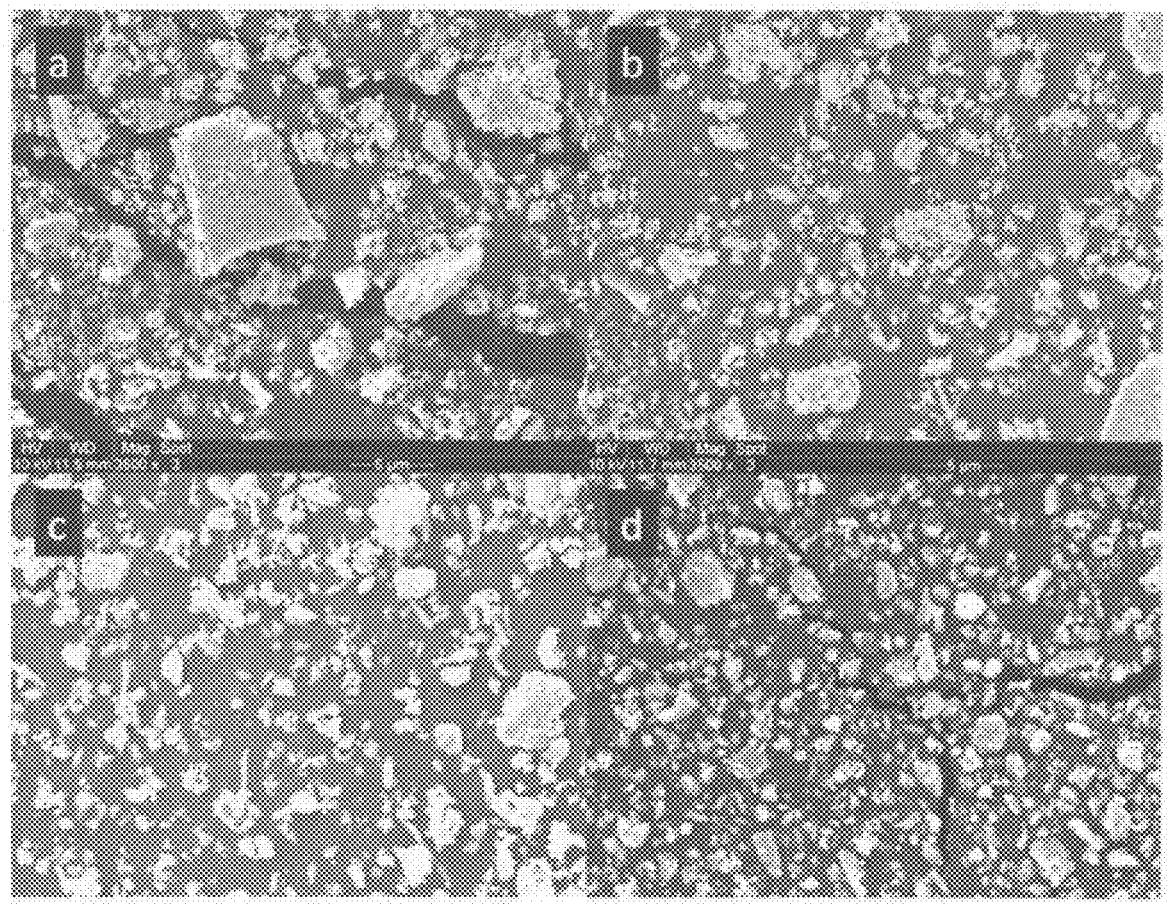
FIG. 2 is a set of SEM photomicrographs of ball-milled LLZBO particles over time intervals of 1 hour, 2 hours, 4 hours, and 8 hours.

The LLZBO powder was next mixed with polyethylene oxide, LiTFSI, and acetonitrile with different LLZBO loads and wet ball milled for 12 hours at 400 rpm to obtain sub-micron LLZBO average particle size. Milling for 8 hours at 400 rpm yielded average particle size of ~620 nm, whereas for 12 hours at 400 rpm, the size was below 500 nm. The polymer to salt weight ratio was kept constant at 7.5:1 for all experiments. FIG. 2 shows the effect of wet ball milling LLZBO particles at for a duration of 1 hour, 2 hours, 4 hours and 8 hours, and an increase in homogeneity in size and decrease in average size is observed.

The load amounts of LLZBO in PEO investigated were 2.5%, 5%, 10%, 30% and 50% by weight. The acetonitrile to solids (polymer+salt+LLZBO) weight ratio was kept at 2:1 for all LLZBO compositions fabricated. In this work we chose Lithium bis(TriFluoromethaneSulfony)Imide salt (LiTFSI) was chosen over $LiClO_4$ as the larger anion has a weaker bonding strength to its cation, resulting in a lower tendency to form ion pairs in the matrix. The resulting slurry for every composition was cast on a 1"×1" square-shaped mold, 1 mm deep casting mold using a syringe.

Sufficient time must also be given to allow for the total evaporation of acetonitrile. Previous work has shown good results with films that are dried slowly at room temperature and atmospheric pressure. In the case of poly(methacrylate) PMA dissolved in ethanol, it was cast overnight and dried at 80° C. to fully remove the solvent. In the case of casting poly(vinyl alcohol) PVA dissolved in an aprotic solvent, the evaporation takes 5 days, at 70° C. in a vacuum chamber. Our films were cast-dried for 72 hours at room temperature at atmospheric pressure to allow slow evaporation of acetonitrile. The film was then removed from the mold and pressed between 2 glass slides and dried at room temperature and atmospheric pressure for a further 48 hours. Total drying time for the films were 5 days.

The ionic conductivity of the films was then characterized employing Electrochemical Impedance Spectroscopy (EIS). The measurements were performed at 23° C., 35° C., 45° C., 55° C., using two stainless steel electrodes with an AC potential of 50 mV employing a custom-built Swagelok-type cell, where the electrodes were tightened to maximize contact between the electrode and the PCE film. EIS measurements at all temperatures were performed after waiting for 2 hours to allow for thermal equilibrium of the materials and electrode components. SEM was used to study the morphology and uniformity of the LLZBO particles dispersed in the polymer film. The PCE films were also analyzed, from 4000 $cm^{-1}$ to 550 $cm^{-1}$.

Results

Figure 3:
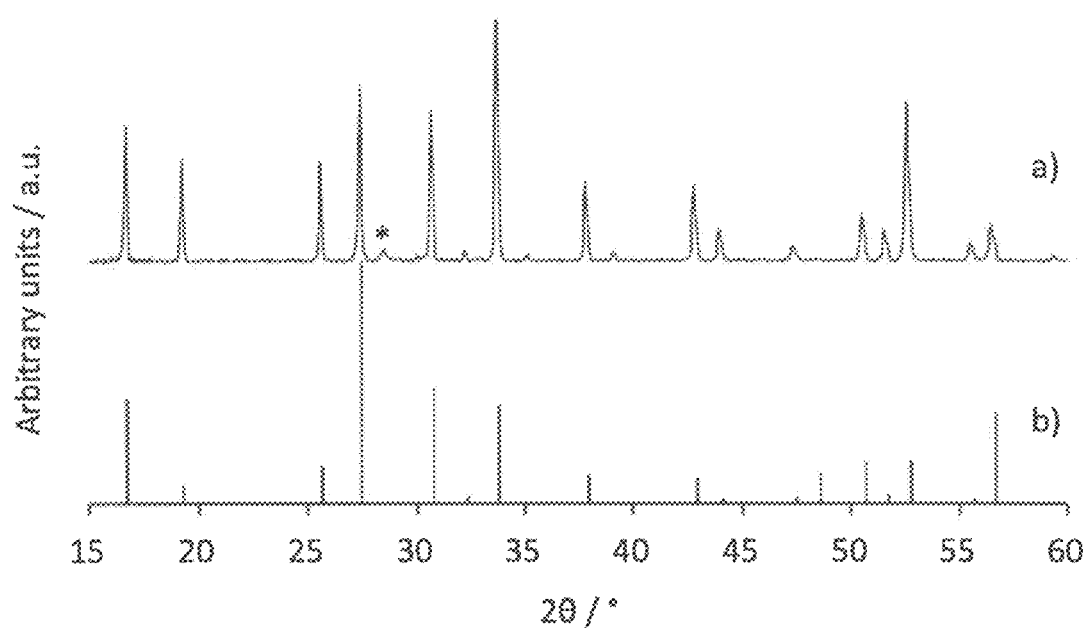
FIG. 3 is a graphic illustration of the XRD spectrum of $Li_{7-x}La_3Zr_{2-x}Bi_xO_{12}$ compared to the XRD spectrum of undoped LLZO.

The synthesized $Li_{7-x}La_3Zr_{2-x}Bi_xO_{12}$ (where x=1) powder crystal structure was characterized by XRD and FIG. 3a shows a typical diffraction spectrum for this sample. To identify its crystalline structure in FIG. 3b the corresponding pattern for cubic LLZO is presented. It is evident that the synthesis method described above, yields the desired cubic phase and only minor impurity traces of secondary phases are evident in the XRD pattern. Specifically, the peak at 28.45° (highlighted by * in FIG. 3) is assigned to $La_2Zr_2O_7$.

It is noted that the intensity of this peak is less than 5% of the intensity of the strongest peak for LLZBO, at 33.66°.

Comparison of the spectra indicate that the phase of Bi-doped LLZO is cubic, and that the diffraction peaks are shifted towards lower 2θ° angles, thereby indicating an increase in lattice parameter. The lattice parameter for LLZBO was estimated to be 13.0094 Å, representing a slight increase of 0.28% compared to the reported value of 12.9727 Å at 300° K.

The presence of trace amounts of $La_2Zr_2O_7$ suggests probable elemental Li losses due to reactions with moisture and/or $CO_2$. Ionic conductivity and structural studies of $Li_{7-x}La_3Zr_{2-x}Bi_xO_{12}$ garnets in pellet form were conducted. IC values and structural properties for bismuth-doped $Li_{7-x}La_3Zr_{2-x}Bi_xO_{12}$, with stoichiometry range x=0, 0.25, 0.5, 0.75, 1 are therein presented.

When casting polymer composite films, the attainment of a homogeneous dispersion of the mesoparticles within the polymer matrix is desired. Particle-particle interactions arising from the evaporation of the solvent can result in agglomeration, affecting the ionic conductivity in these matrixes. Films with well-dispersed particles can be achieved when preparing slurries with high viscosities and higher molecular weights. Taking this into account, a 2:1 by weight solvent to solids ratio is convenient. By using this solvent-to-solids ratio, and ball milling the PEO:LiTFSI+LLZBO system for 12 h at 400 rpm, a more uniform distribution of the LLZBO particles in the PEO matrix is attained. Additionally the particle size is decreased, which has a positive effect on the ionic conductivity.

Figure 4:
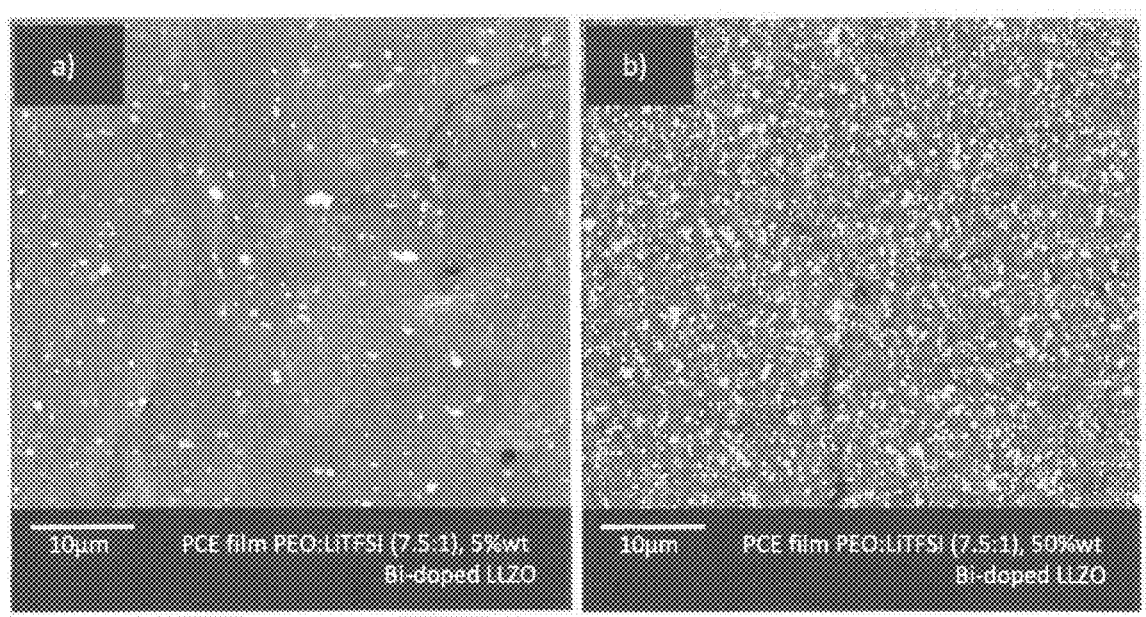
FIG. 4 is a SEM photomicrographic comparison of 5% LLZBO particles dispersed in PEO and 50% LLZBO particles dispersed in PEO.

FIG. 4 displays SEM images of LLZBO particles dispersed in PEO matrixes, for 5 wt. % and 50 wt. % loads. For the lower load, an essentially contiguous, smoother surface is observed, and the LLZBO particles are dispersed quite uniformly across the surface. For a load of 50 wt. %, a rougher surface is observed, exhibiting cracks in the middle of the image. Note the particles observed are those near the surface of the film.

Figure 5:
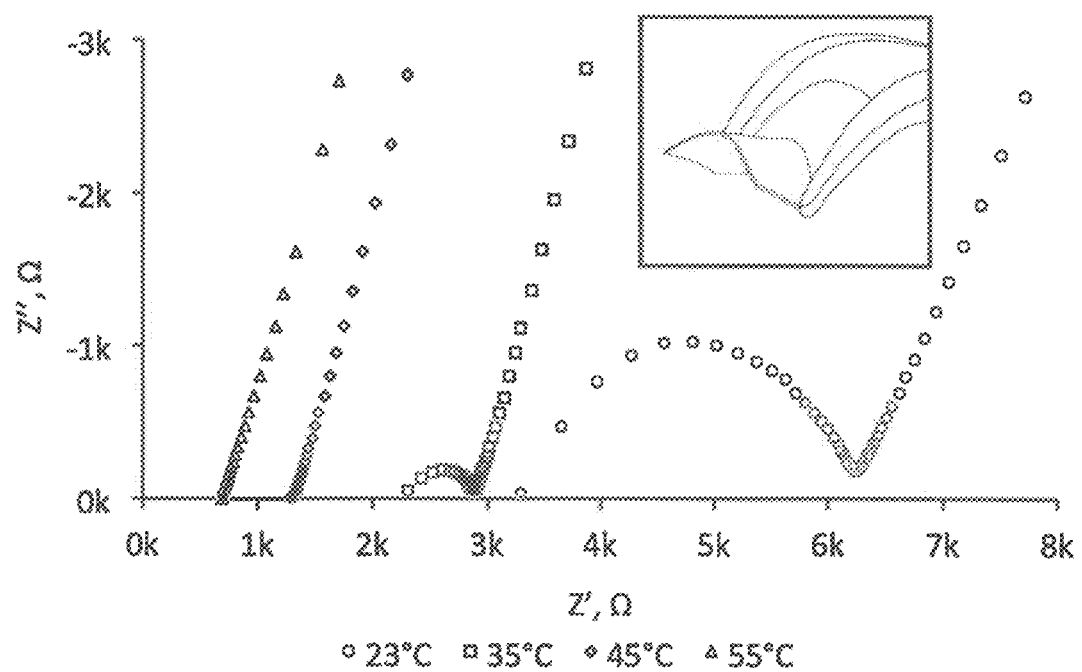
FIG. 5 graphically illustrates Nyquist plots for LLZBO-PEO composite electrolytes with wt. 5% LLZBO loading at different temperatures.

FIG. 5 presents Nyquist plots for a polymer composite electrolyte film, with 5 wt. % LLZBO content in PEO, measured at 35° C., 45° C., and 55° C. PCE films were cast with the following LLZBO weight loads: 0%, 2.5%, 5%, 10%, 30%, and 50%. EIS measurements were performed on each composite film having different weight loads over the same temperature range. Each film showed no significant degradation after heating to 55° C. An image of a flexible composite membrane containing 5% wt. LLZBO is shown in the insert of FIG. 5.

The highest ionic conductivity observed was for the composite film with 5% wt. LLZBO. Ionic conductivity values of $2.00 \times 10^{-5}$ S/cm, $1.09 \times 10^{-4}$ S/cm and $5.45 \times 10^{-3}$ S/cm are inferred from these plots at 23° C., 35° C. and 55° C. respectively. Note that measurements at 35° C., are one order of magnitude higher than those obtained in comparable PCEs comprising tetragonal LLZO embedded in PEO: $LiClO_4$. An ionic conductivity value of $1 \times 10^{-5}$ S/cm was measured at 35° C. Furthermore, the highest ionic conductivity values in comparable PCEs were achieved with LLZO loads of 52.5 wt. %.

Figure 6:
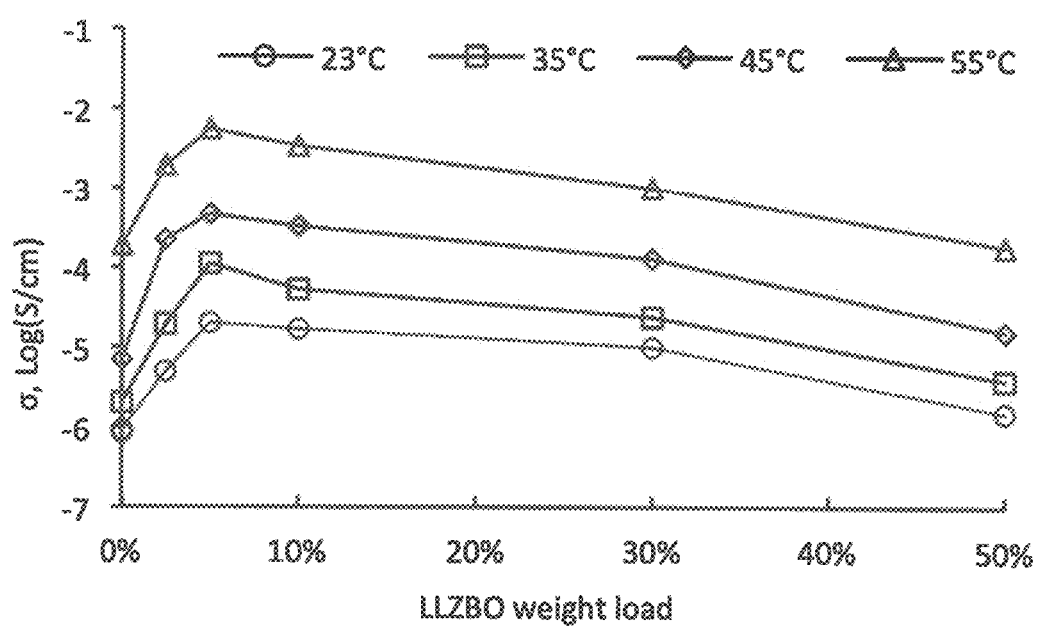
FIG. 6 graphically illustrates ionic conductivity values for LLZBO-PEO composite electrolytes as a function of LLZBO loading and temperature.

FIG. 6 presents ionic conductivity values for a range of composite LLZBO-PEO samples as a function of temperature. As indicated above, the highest ionic conductivity value in the instant samples was obtained for a LLZBO weight load of 5%, in sharp contrast to comparable PCEs.

Figure 7:
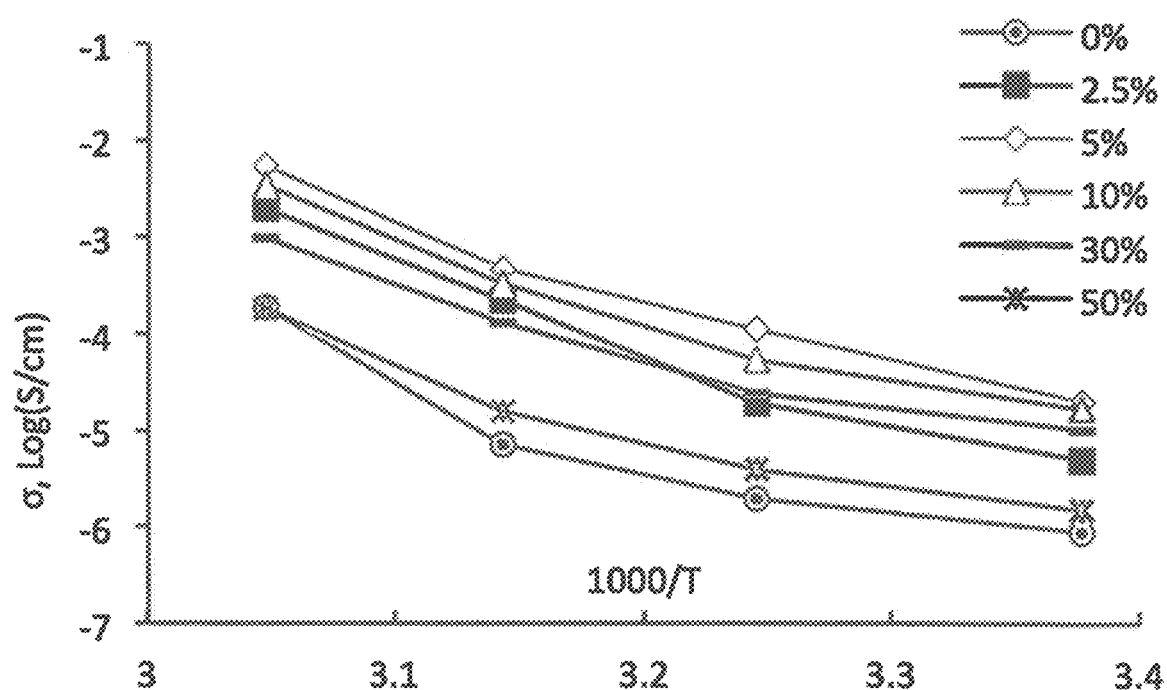
FIG. 7 graphically illustrates Arrhenius plots for LLZBO-PEO composite electrolytes as a function of LLZBO loading.

FIG. 7 provides Arrhenius plots for PCEs with different weight loads. With increasing temperature, the ionic conductivity increases. Li-ion transport in PEO has been proposed to be mediated by conformational changes of the polymer chains, as the lithium ion forms bonds with ether oxygen, breaks them, and is transported along and between polymer chains. It can be expected that with increasing temperature, the vibrational energy of the polymer chains will increase, leading to an increase in segmental motion, overcoming the energy barrier bonding the Li atom to the ether oxygen in the polymer chains. The ionic conductivity results presented in FIG. 7 is observed to increase with low addition of LLZBO at 2.5% wt., and attain a maximum value at the 5% wt. LLZBO load and then decreases for values of 10%, 30% and 50% wt. The lowest set of ionic conductivity values obtained at 50% LLZBO wt. are still higher than those corresponding to the PEO without LLZBO. It should be noted that for different dopants/dopant combinations, the weight loads/weight load ranges for optimized or maximized IC may be different.

Discussion

Ionic conductivity values of $1.09 \times 10^{-4}$ S/cm at 35° C. and $5.45 \times 10^{-3}$ S/cm at 55° C. were measured in a PEO:LiTFSI matrix with 5% wt. LLZBO polymer composite film. As the weight load is increased to higher values, the IC decreased and approached the value of a PCE film without LLZBO addition. These IC values are approximately one order of magnitude higher than those in a comparable system. These results are next discussed as well as a likely mechanism at work.

The embedded particles in the PEO matrix hinder polymer recrystallization, resulting in a more flexible polymer matrix, allowing more complexation of the lithium cation with the oxygen on the PEO chain. Lithium cations diffuse through inter-chain and intra-chain polymer motion. A PEO phase with a high degree of amorphicity will transport the cation more freely, and a more crystalline phase will transport the cation more slowly.

As evidenced by the results of FIGS. 5-7, LLZBO additions have a dramatic effect on the composite's ionic conductivity. Following up on the notion that the ionic conductivity increments observed are not solely due to the structural changes in the polymer matrix brought about by the particle inclusion and instead arise from the garnet particles, $Al_2O_3$ rather than LLZBO particles was incorporated into identical PEO:LiTFSI mixtures to fabricate polymer composite electrolytes. The same procedures described above were employed to fabricate flexible membranes with 5% wt. $Al_2O_3$. The ionic conductivity for these samples was measured over the same temperature range studied for the case of PEO:LiTFSI-LLZBO.

Figure 8:
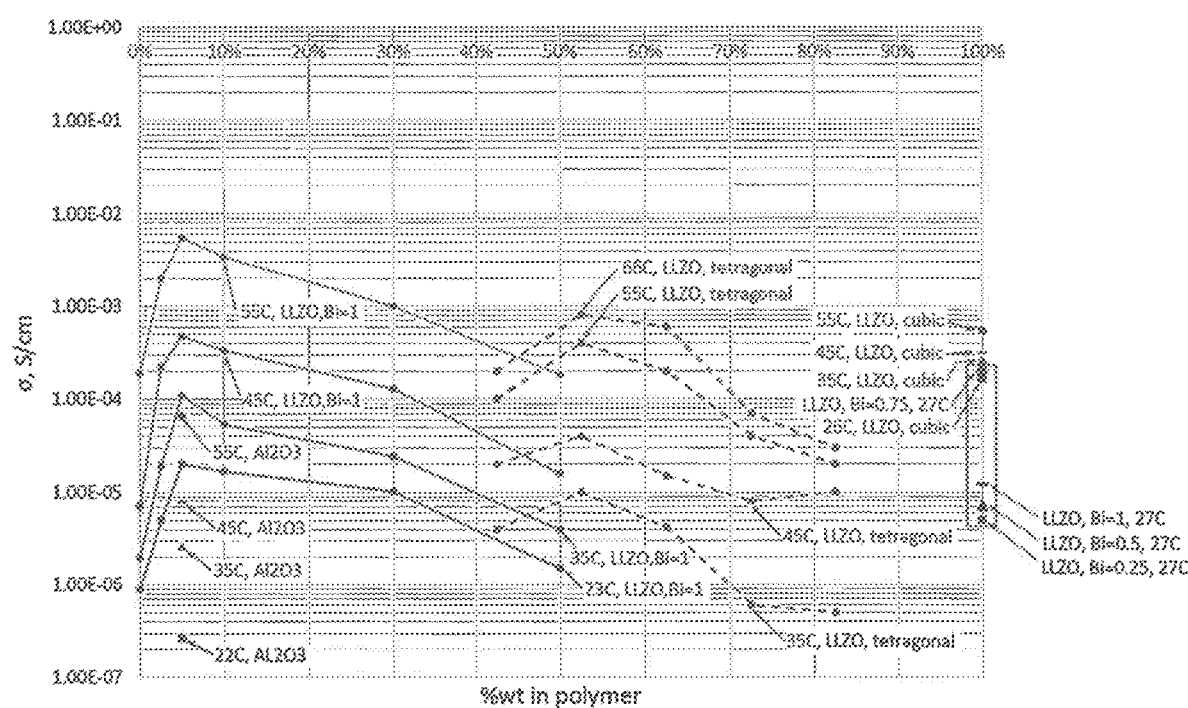
FIG. 8 graphically compares ionic conductivity for different electrolyte compositions.

FIG. 8 provides a summary of ionic conductivity for different electrolyte compositions. The solid lines correspond to the measurements obtained for the PEO:LiTFSI (molar ratio 7.5:1)-LLZBO (cubic) sample series as a function of LLZBO weight load and temperature.

The Bi content of these sample series was held constant at Bi=1.0. The dashed lines are the results for the prior art case of PEO:LiClO$_4$ (molar ratio 15:1)-LLZO (tetragonal) structures. Measurements for 5% wt. $Al_2O_3$— PEO:LiTFSI composites are shown in comparison. Values were also measured at 27° C. for LLZBO (cubic) pellets with various Bi contents. The pellets were sintered at 900° C. for 10 hrs. Displayed are also the results for $Li_{6.4}Al_{0.19}La_3Zr_2O_{11.8}$ (cubic) sintered at 1200° C. for 36 hrs.

In comparing the results of FIG. 7, the following key observations are made:

I. The ionic conductivity of the LiLaZrBiO-PEO:LiTFSI of the instant samples readily exceed by 10× those reported in the prior art for LiLaZrO-PEO:LiClO$_4$ across the temperature range studied.

II. The maximum ionic conductivity for LiLaZrBiO-PEO:LiTFSI is attained for a mesoparticle wt. load 10× smaller (5% vs 52%) than that for prior art LiLaZrO—PEO:LiClO$_4$.

III. Substituting LiLaZrBiO by $Al_2O_3$ mesoparticles of comparable dimensions and for the same wt. load (5%), decrements the ionic conductivity of the composite by at least 100×.

IV. The highest ionic conductivity measured at 27° C. in LiLaZrBiO pellets corresponds to the sample with Bi=0.75 composition and it is at least 10× higher than for Bi=1.0, the instant composition.

V. Comparison of LLZO pellets with doped Bi vs Al at ~26° C., shows comparable ionic conductivities. However the Al-doped LiLaZrO samples were sintered at 1200° C. for 36 hrs vs. 900° C. for 10 hrs for the case of the Bi-doped LLZO specimens.

It is evident and remarkable that the incorporation of small amounts of LiLaZrBiO within the PEO:LiTFSI matrixes has profound improvements in the ionic transport in the composite electrolyte. To understand the transport mechanism in these composites, three factors may be considered: a) LLZBO intra-particle ionic conductivity; b) interactions between the mesoscopic particles and the polymer chains and c) ion transport across the polymer matrix which is more efficient in the amorphous phase. Whereas presently, there is no full description of the particle-salt-polymer interactions that may account for such remarkable effects, it is noteworthy to consider the localized chemical interactions. LLZO garnets can act as Lewis base centers and Lewis acid centers. For example, $Li^+$, $La^{3+}$ and $Zr^{4+}$ act as acid centers on the surface of the garnet, they form bonds with the ether oxygen of the polymer chain (a Lewis base center), increasing disorder of the polymer phase around the particle, thus increasing the amorphous fraction and the ionic conductivity. Lithium vacancies, however, can act as Lewis base centers, interacting with free lithium ions in the PCE system.

The observed trend in ionic conductivity of the composites vs. LLZBO wt. load, exhibiting first an increase, and then a subsequent decrease after reaching a maximum value, is consistent with the modified effective medium theory model. The model proposes the formation of a highly amorphous layer at the interface of a filler particle and the polymer matrix. This interface is suggested to provide an effective conducting pathway for charge carriers. As the volume fraction of the filler increases, the ionic conductivity does not monotonically increment. It attains a maximum value for a specific wt. load of LLZBO, further increments in wt. loads, is suggested to lead to particle agglomeration, thereby decreasing the total particle surface area available for interfacing with the amorphous component of the polymer matrix. Thus, the volume fraction of the highly conductive interface region between particle and crystalline polymer region decreases.

Lower ionic conductivity values for the films containing 10%, 30% and 50% suggest that at higher concentrations of LLZBO, the filler particles start to interact with the ether oxygen sites, leaving less ether sites available to solvate the LiTFSI ion pairs. And so, ion pairs start to aggregate. Agglomeration of the salt decreases the ion conductivity by inhibiting mobility of the polymer chains.

Another factor potentially responsible for the larger ionic conductivities observed in the instant material relates to the fact that the active filler is cubic, whereas in the prior material, tetragonal LLZO was added to the PEO. The cubic phase of LLZO is reported [17] to be 100× more ionically conductive than the tetragonal counterpart, due to the closer proximity in the cubic phases of the Li-sites in the garnet structure.

In summary, the synthesis process for $Li_6La_3ZrBiO_{12}$ (LLZBO) garnets has been presented, as well as the fabrication of PCE films of PEO:LiTFSI with increasing weight loads of LLZBO (0%, 2.5%, 5%, 10%, 30% and 50%). The LLZBO powder was characterized by XRD and the films were electrochemically characterized with EIS and the distribution of the LLZBO particles in the matrix was observed with SEM.

The highest ionic conductivity achieved for these films was found for a LLZBO load of 5% wt., with a value of $1.09 \times 10^{-4}$ S/cm at 35° C. and $5.45 \times 10^{-3}$ S/cm at 55° C. A synergistic effect is observed where the resulting IC from a 5% load by weight is significantly higher than the value measured for a pure PEO film or LLZBO pellets at 27° C. These results show an IC improvement of approximately an order of magnitude compared with similar research on PCE loaded with tetragonal LLZO. We note that with the effect of bismuth doping on the IC of LLZO, that the highest value of IC was obtained for the compound with Bi=0.75. Therefore, we suggest that higher IC values of the PCE films here reported can be obtained by incrementing the bismuth concentration.

Furthermore, we provide evidence that LLZBO is a "effective active filler" and the ionic conductivity of the PEO:LiTFSI is enhanced by at least 100× with the addition of these garnet particles. No increment in ionic conductivity was observed when, embedding mesoparticles of $Al_2O_3$ of comparable dimensions and for the same loading concentration (5 wt. %), as for the case of LLZBO.

The likely contributors for the improvements of ionic conductivity over previously reported results in the case of LiLaZrO—PEO:LiClO$_4$. composites are: the addition of cubic phase Bi-doped LLZO, as opposed to tetragonal form, this is ascribed to the reduction in lattice spacing between the Li-sites in the garnet structure; reduction of particle size and improvements in particle size distribution attained through ball milling or attrition milling.

The surface of the LLZBO particles can act as Lewis acid centers, and the ether oxygen from the PEO backbone coordinates with these sites, preventing chain reorganization and forming a highly conductive amorphous layer around the particle. This oxygen-LLZBO coordination decreases the LiTFSI solvation, leaving neutral high-mobility LiTFSI ion pairs to decrease chain reorganization in the bulk polymer matrix. However, there is an optimum amount of LLZBO that can be added to a PEO:LiTFSI matrix. Increasing it beyond this threshold, the LLZBO particles possibly begin to agglomerate, essentially decreasing the particles' surface area in contact with amorphous PEO, resulting in ionic conductivity decrease.

The findings for LiLaZrBiO-PEO:LiTFSI composites herein are interesting: even at RT, the composites exhibit higher ionic conductivities than that of the pure pellet material and over two orders of magnitude higher than the polymer-salt matrix. This increased ionic conductivity increment is achieved by incorporating only a very small fraction of LLZBO. The result is a flexible membrane thin film with attractive mechanical properties for battery applications, requiring no excessive sintering temperatures and prolonged sintering times. This represents significant cost savings in materials and processing for this solid-state electrolyte with the mechanical advantages of a flexible membrane for incorporation into battery devices.

Consistent with prior findings, addition of filler particles as discussed above decreases the crystalline fraction in the polymer phase. Hence, if the degree of amorphicity is the key for attaining high ionic conductivity in PCEs, it would follow that a PCE with maximum amorphous fraction would yield maximum or optimum ion transport. However, semi-crystalline systems are observed to exhibit greater ionic conductivity perform than fully amorphous PCE systems, giving rise to an alternative, versatile method of optimization of the polymer electrolyte microstructure through chemical and structural manipulation of the filler. Addition of filler particles to polymers influences spherulite formation. Spherulites comprise crystalline lamellae connected by amorphous regions. The physio-chemical properties of the filler particles influence the nucleation rate, growth, size, and interconnectivity of spherulites. In the case of LLZO, aliovalent substitution into the Zr-site alters the vacancy occupancy at the Li site, resulting in different degrees of surface charges depending on the Li-vacancy occupancy. Furthermore, charged sites on the particle surface act as Lewis-base centers influencing the rate of lithium salt dis-association. As discussed below, Bi dopant amount in LLZO influences the PCE microstructure and its ionic conductivity.

Example

Two $Li_{7-x}La_3Zr_{2-x}Bi_xO_{12}$ garnet powders were synthesized using a sol-gel Pechini method. The compositions of the garnet powders were $Li_{6.25}La_3Zr_{1.25}Bi_{0.75}O_{12}$ (0.75Bi-LLZO) and $Li_6La_3ZrBiO_{12}$ (Bi-LLZO). The high IC garnet cubic phase was obtained after powder calcination at 700° C. for 10 hours. The LLZO powders were mixed with polyethylene oxide, lithium bis(trifluoromethanesulfonyl)imide and acetonitrile (ACN) was used as solvent to mix the composite materials. ACN was mixed at a 2.5:1 liquid to solids ratio to form the PCE slurry.

The ethylene oxide to Li-ion (EO:Li) ratio was kept at 49:1. All the materials were mixed, and wet ball milled for 12 hours at 400 rpm. Milling for 12 hours at 400 rpm yielded mesoparticles of ~437 nm in size. To study the effect of passive filler particle loading, the same procedure was employed to synthesize PCEs loaded with 5 wt. % 500 nm particulate $Al_2O_3$. PCE films were prepared by pouring the slurry into molds of different depths and surface area to study the IC dependence on film thickness. All films were dried for 72 hours at room temperature in air to allow slow evaporation of ACN. Thereafter, the films were held in vacuum overnight to completely remove the solvent.

Ionic conductivity was characterized using Electrochemical Impedance Spectroscopy (EIS). Temperature dependent measurements were performed at 22.5° C., 35° C., 45° C. and 55° C., with a custom-built Swagelok-type cell using two stainless steel electrodes whose separation was adjusted to maximize contact with the PCE film. An impedance/gain-phase analyzer and electrochemical interface operating in the frequency range 100 MHz to 300 kHz was employed. An AC potential of 50 mV was applied to the PCE membrane. Prior to performing EIS measurements at all temperatures, the PCEs and electrode components were allowed to reach thermal equilibrium over a 2-hour period. The cubic nature of the LLZO garnet was verified by XRD, Cu source (1.54 Å), using a scan rate of 5°/min. The microstructure of PCE films was also investigated by XRD, a scan rate of 2.5°/min was employed for this case. Polarized light microscopy (PLM) was employed to investigate spherulite formation as a function of LLZO particle weight load.

Figure 9:
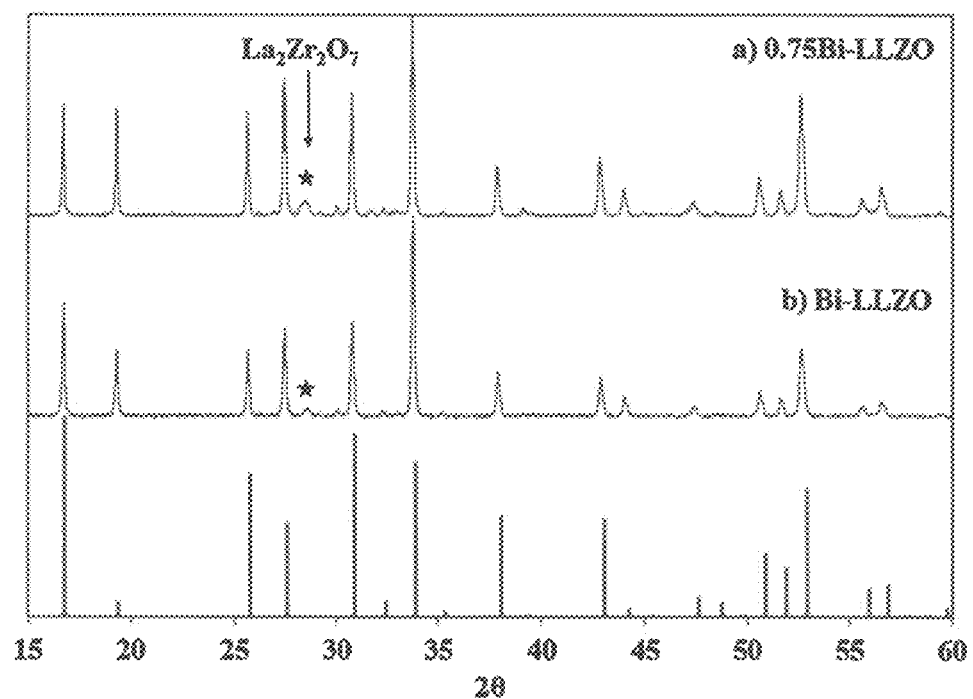
FIG. 9 graphically illustrates XRD spectra for: a) 0.75Bi-LLZO and b) Bi-LLZO, c) reference PDF pattern corresponding to the cubic phase of LLZO.

FIG. 9 shows the XRD scan for the 0.75Bi-LLZO powder sample, Bi-LLZO, and a reference pattern for cubic LLZO. The cubic phase formation is verified at a calcination temperature 700° C. The peak at 28.45° is identified to correspond to $La_2Zr_2O_7$, a common byproduct in LLZO synthesis. The presence of trace amounts of $La_2Zr_2O_7$ is suggestive of probable Li loss. The ionic conductivity at 27° C. of sintered pellet samples was previously determined to be $2\times10^{-4}$ S/cm and $1.2\times10^{-5}$ S/cm for 0.75Bi-LLZO (relative density of 0.83) and Bi-LLZO (relative density of 0.84) respectively.

Figure 10:
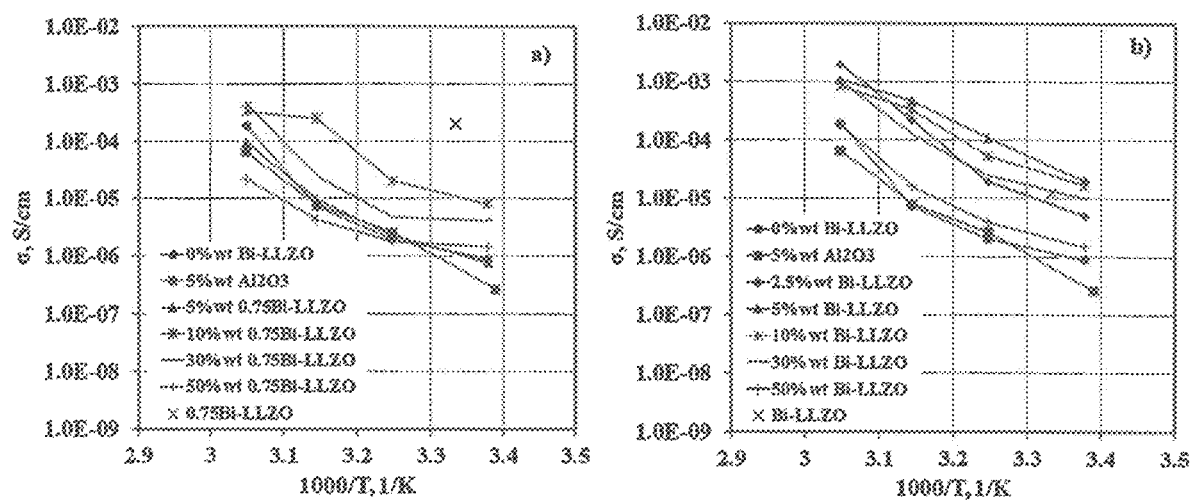
FIG. 10 graphically illustrates IC dependence on temperature for PCEs with different weight loads of 0.75Bi-LLZO and (b) for Bi-LLZO additions.

The temperature dependence of the IC on weight load (5%, 10%, 30%, 50%) for 0.75Bi-LLZO additions to PEO:LiTFSI is shown in FIG. 10. The results are compared to those measured with 5% wt $Al_2O_3$ particle addition and that for a garnet pellet of the same composition at 27° C. The ionic conductivity of PEO:LiTFSI with 5% wt load of 0.75Bi-LLZO particles does not change significantly, however when the weight load increases to 10% wt, the IC is enhanced by factors of ~10× and 15× over the unloaded sample at 22.5° C. and 45° C., respectively. The pellet 0.75Bi-LLZO sample exhibits an ionic conductivity (measured at 27° C.)~10× larger than the PCE loaded with 10% wt load particles of the same stoichiometry. Loading the PCE with 5% wt load of Bi-LLZO particles increases the ionic conductivity of the PEO:LiTFSI matrix more than an order of magnitude at 22.5° C. IC values for this 5% wt. load are $2\times10^{-5}$ S/cm and $5.45\times10^{-3}$ S/cm at 22.5° C. and 55° C. respectively. The strong influence of the garnet particles Bi-composition on the weight load amount needed to achieve the highest IC in the PCE is noted. Of interest is also the fact that the IC of the 5% wt Bi-LLZO PCE film at 22.5° C. is higher than that of the pellet sample of the same composition measured at 27° C.

Figure 11:
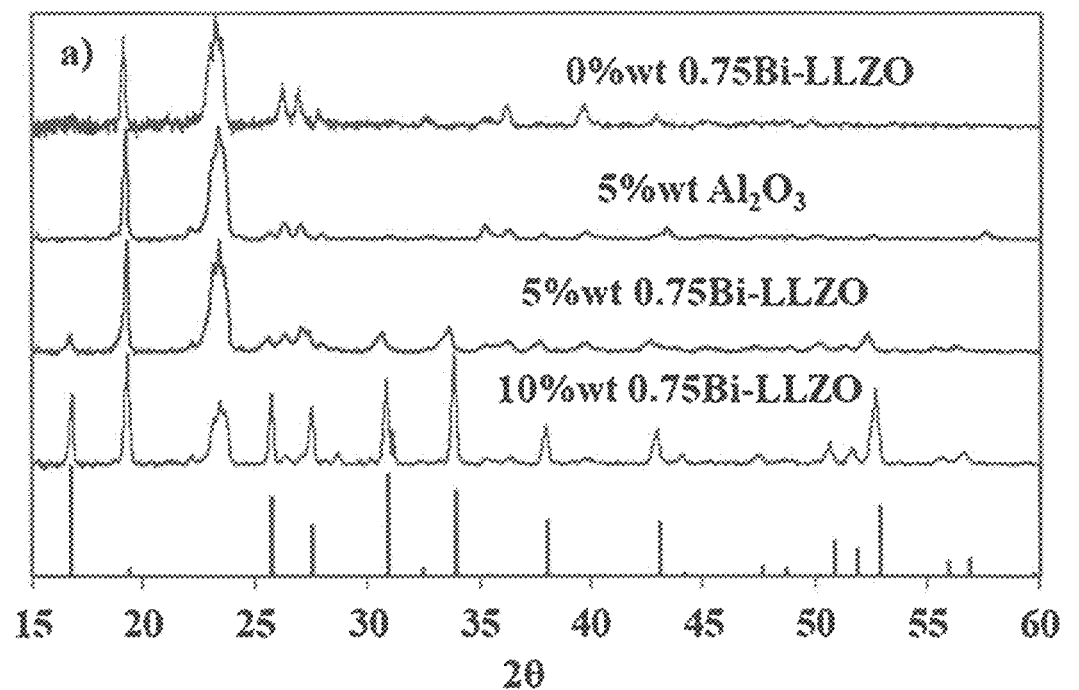
FIG. 11 graphically illustrates XRD patterns for PEO: LiTFSI with varying weight loads of (a) 0.75Bi-LLZO and (b) Bi-LLZO.
Figure 11:
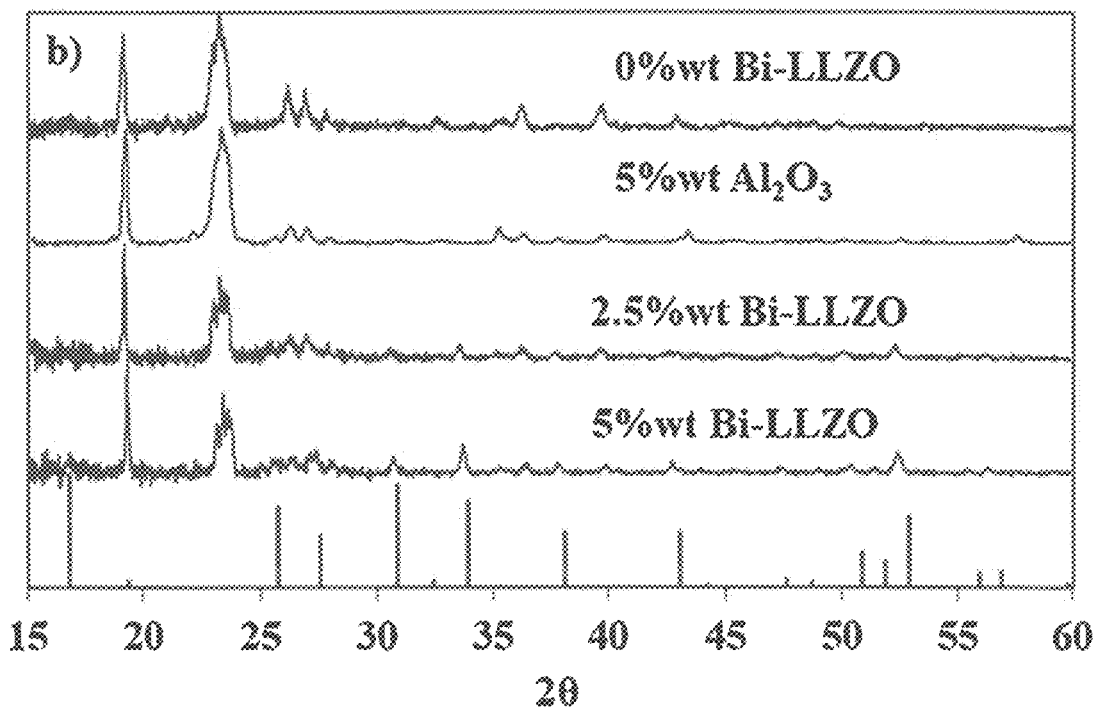

FIG. 11 presents XRD scans for PCE films with varying weight loads of 0.75Bi-LLZO and Bi-LLZO respectively. An intensity decrease of the PEO crystalline triple peaks observed at 23.5° is observed upon filler addition for both $Al_2O_3$ and LLZO. Present in the diffraction patterns of the loaded samples are reflections corresponding to cubic LLZO, whose intensities increment with higher LLZO particle load amounts.

The intensity decrease of the PEO crystalline triple peaks at 23.5° upon filler addition is indicative of an increment in the amorphous fraction in the PCE. However, the peak intensity changes observed at 5% wt and 10% wt loads of Bi-LLZO and 0.75Bi-LLZO particles to PEO:LiTFSI respectively, do not indicate a drastic change in crystallinity that is responsible for the large IC changes observed. The absence of peaks for LiTFSI salt indicates full dissolution of the lithium salt in PEO.

Figure 12:
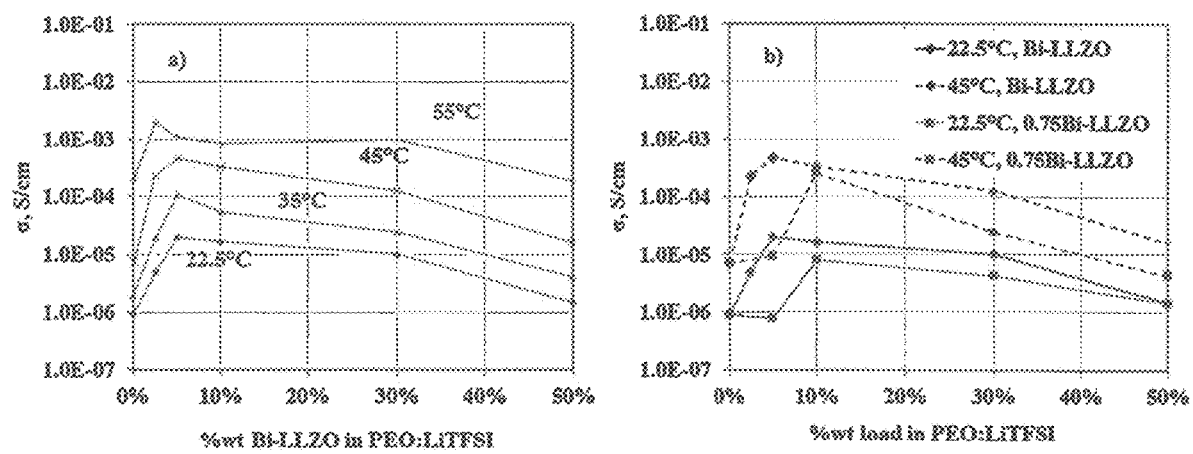
FIG. 12 graphically illustrates ionic conductivity of PEO: LiFTSI as a function of weight load of Bi-LLZO at different temperatures, and IC weight load dependence at 22.5° C. and 45° C. for 0.75Bi-LLZO and Bi-LLZO additions.

FIG. 12 graphically illustrates the IC dependence on Bi-LLZO particle weight load of the PEO:LiTFSI system at different temperatures. The IC of the unloaded PEO:LiTFSI increments as the sample temperature is raised. Adding 5% wt Bi-LLZO load increments IC by 12×, 19×, 20× and 9× at 22.5° C., 35° C., 45° C. and 55° C. respectively. The increment is less pronounced at 55° C. and is attributed to approximation of the PEO melting point (66° C.-75° C.), which is lowered by the added LiTFSI and Bi-LLZO. FIG. 12 compares the IC weight load dependence for 0.75Bi-LLZO and Bi-LLZO additions to PEO:LiTFSI at 22.5° C. and 45° C. It is interesting to observe the different behavior of the weight load curves. For the PCE film containing 0.75Bi-LLZO, the maximum IC was reached at 10% wt load, whereas for the film with added Bi-LLZO the highest ionic conductivity is reached at 5% wt load.

Conventional wisdom has it that an increase in the amorphous fraction of the polymer by filler additions is expected to enhance IC. To first order, one would expect a proportional increment of IC on filler weight load amount and that, at the active filler percolation threshold, the IC would attain a maximum value. This is not the behavior observed in the results hereinbelow presented. The counterintuitive conductivity behavior observed related to the low volume fraction required for significant IC enhancements, and the influence of the Bi content in the LLZO filler on optimum volume fraction, cannot be explained by this simple framework necessitating the consideration of other factors in explaining Li-ion transport in these PCEs. In particular, the influence of the physio-chemical properties of the Bi-doped LLZO fillers on the microstructure of the polymer matrix must be considered. Accordingly, polarized light microscopy (PLM) was used to examine the PCE morphology.

Figure 13:
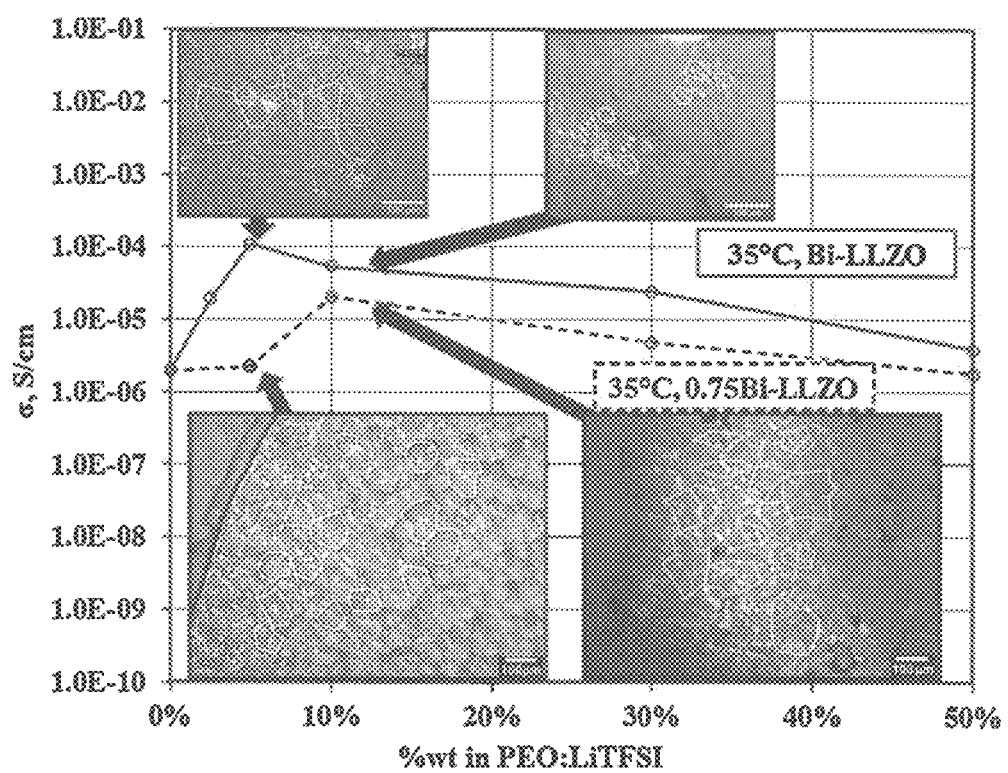
FIG. 13 graphically illustrates ionic conductivity measurements at 35° C. of PEO:LiTFSI matrixes vs. added weight load of LLZO meso-particles.

As illustrated in FIG. 13, the IC dependence on particle weight load at 35° C. is shown together with spherulite PLM images of PCEs loaded with 5% and 10% Bi-LLZO and 0.75Bi-LLZO particles. The average spherulite size for the 5% wt Bi-LLZO loaded samples was ~98 μm in diameter, and when the particle weight load is increased to 10% wt, the spherulite size decreased to ~39 μm. Whereas for the case of the 0.75Bi-LLZO loaded sample the spherulite average size is observed to increase from ~87 μm to ~119 μm upon increasing the particle weight load from 5% to 10%. The concomitant changes in ionic conductivity are from $1.09\times10^{-4}$ S/cm to $5.33\times10^{-5}$ S/cm and from $2.27\times10^{-6}$ S/cm to $2.05\times10^{-5}$ S/cm for Bi-LLZO and 0.75Bi-LLZO particle additions respectively.

This behavior is best attributed to heterogenous nucleation of spherulites in PEO induced by added filler particles. Thus, Bi-LLZO and 0.75Bi-LLZO mesoparticles provide spherulite heterogeneous nucleation sites. With smaller spherulites present in increasing numbers as nucleated by the filler particles, the tortuosity of interconnected amorphous inter-lamellar channels in the polymer increases, hindering the ionic transport across the polymer matrix. Alignment of said inter-lamellar amorphous channels in the polymer significantly enhance the ionic conductivity. In the absence of filler particles, spherulites randomly nucleate as the polymer solidifies from the melt. The presence of Li-salts may be used to slow down the random nucleation and growth rates of spherulites. Bi-LLZO and 0.75Bi-LLZO filler particle surfaces provide nucleation centers for PEO spherulite formation, and their growth rate is faster than those formed from random nucleation. At low filler weight loads, crystallization rates increases, and as weight loads are increased, the crystallization rates are observed to decrease. Thus in these LLZO PCEs, two competing spherulite growth mechanisms are present: a slow randomly nucleated process and a faster heterogeneous nucleation mechanism. The nucleation and growth rate of spherulites nucleated by the LLZO particles is a function of Li-vacancy occupancy determined by particle Bi-content.

Polymer electrolyte morphology may be controlled to optimize Li-ion transport through the chemical and structural manipulation of the filler garnet mesoparticles. Addition of LLZO particles to PEO:LiTFSI matrices introduces charged sites on the particle surface which act as Lewis-base centers that enhance the kinetics of lithium salt disassociation. These surface-charged sites originate from lithium vacancy defects that are created through aliovalent substitution of Zr in LLZO with elements such as Bi, Al, Mg, S, and Ta. In particular, Bi content in LLZO filler particles influences PCE microstructure and its ionic conductivity.

As shown in FIG. 10, the amount of Bi-LLZO and 0.75Bi-LLZO particles needed to significantly increment the polymer matrix IC is very small and significantly less than the particle percolation threshold. The particles are widely separated and are homogeneously distributed. There is a strong influence of the Bi-composition of the garnet particles on the weight load amount needed to achieve the highest IC in the PCE. The difference in the garnet particle Bi-content for achieving the highest IC in the PCE and pellet samples. We have observed IC dependence of LLZO garnets pellets on Bi content, with a maximum value for Bi=0.75 that is a factor of ~17× higher than that for Bi=1.0. The IC enhancement provided by the added filler particles to the polymer matrix persists over the temperature range observed. The enhancement of the IC in these PCE brought about by the garnet particle additions, is not due simply to higher ionic transport within the filler particles (the particles are too widely dispersed and not interconnected) but rather, that the particle composition exerts a critical influence in the macroscopic ion transport across the polymer matrix. Furthermore, the effect of the optimum particle load and Bi-content dependence on IC enhancement over the temperature range studied shows a similar trend. Bi-content of the garnet particle has a significant effect on macroscopic transport in the polymer matrix. The Li+ ion motion requires, amongst other, surmounting the energy that binds the ion to the ether-bonds of the polymer chain. Collectively, mechanisms hindering ion migration can be considered as energy barriers to ion transport. The data presented in FIG. 10 is utilized to derive activation energies (EA) from Arrhenius plots for the various particle % wt. EA is calculated from the equation $$\sigma = Ae^{-E_A/kT}$$

where σ is the ionic conductivity, A is the frequency factor, k is Boltzmann's constant and T is the temperature. For the films with Bi-LLZO, (EA) decreased from 1.34 eV at 0% wt to 1.07 eV at 5% wt. For the films with 0.75Bi-LLZO, (EA) decreased from 1.34 eV at 0% wt to 1.08 eV at 10% wt. (EA) for both Bi-doped samples incremented to ~1.2 eV for 30% wt additions. Arrhenius plots for the ionic conductivities and details of the calculations are given in the supplemental information. The results presented in FIG. 11, corresponding to XRD scans for PCE films with varying % wt of 0.75Bi-LLZO and Bi-LLZO respectively, do not provide evidence for a crystalline to amorphous phase transition at the optimum % wt added to the polymer matrix for optimum IC.

The morphology of polymer materials and the degree of crystallinity is determined to a large extent by spherulite formation. Their formation is associated with crystallization of polymers from the melt and is controlled by the number and type of nucleation sites, the structure and chemical composition of the polymer molecules and the cooling rate from the melt. Spherulites grow radially from nucleation centers and their growth is controlled by the polymer crystal growth kinetics and the volume competition driven by the density of nucleation sites and the dimensions of the material. The drastic decrease of conductivity during crystallization is related to the closing of amorphous conductivity pathways by growing spherulites. Adding fillers to PEO has great influence on the heterogeneous nucleation and growth of spherulites in the polymer matrix.

Figure 14:
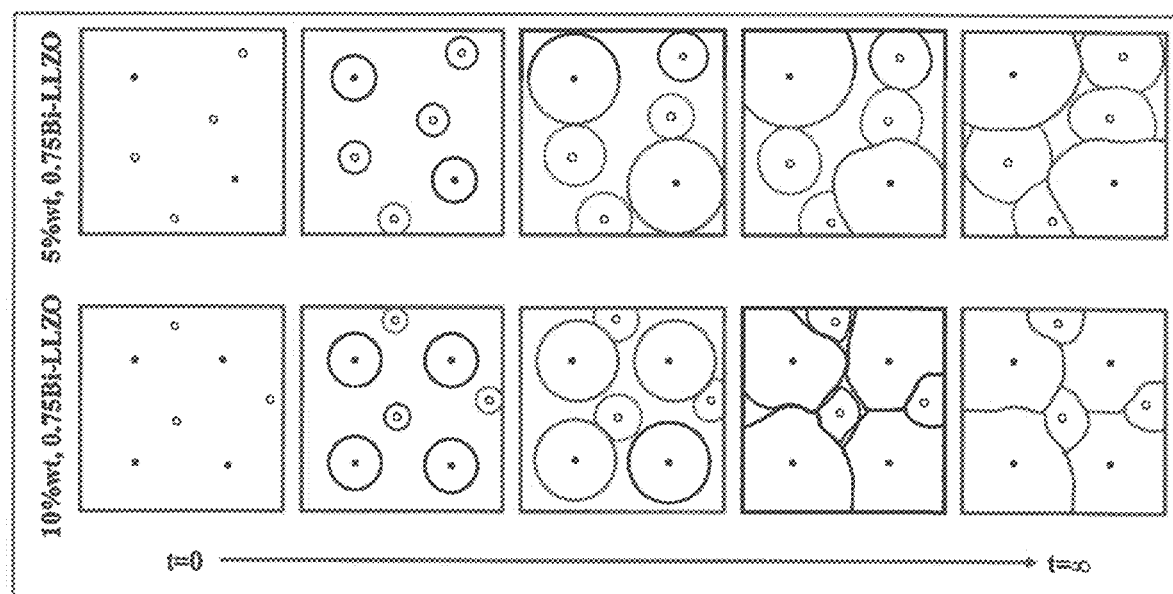
FIG. 14 graphically illustrates spherulite formation and growth in PCEs loaded with 0.75Bi-LLZO particles at the 5% wt and 10% wt level.

The influence of spherulite nucleation rate on the evolution of the final polymer morphology as a function of the filler particle addition can be explained with the help of FIG. 14. As an example, the time evolution of spherulite growth is depicted for PCEs with two weight loads of 0.75Bi-LLZO particles will be explained. Crystallization from the melt (t=0) generates random nucleation sites and the filler particles provide heterogenous spherulite nucleation sites. The spacing between filler particles for the 5% wt load is larger than for the 10% wt loaded sample. The figure illustrates the subsequent growth of spherulites as a function of time from both random and particle sites. For the case of the 5% wt load, there is ample polymer volume for spherulite growth from both types of nucleation sites so that at t=∞, growth velocity and volume competition, yields on average, smaller spherulite sizes.

Figure 15:
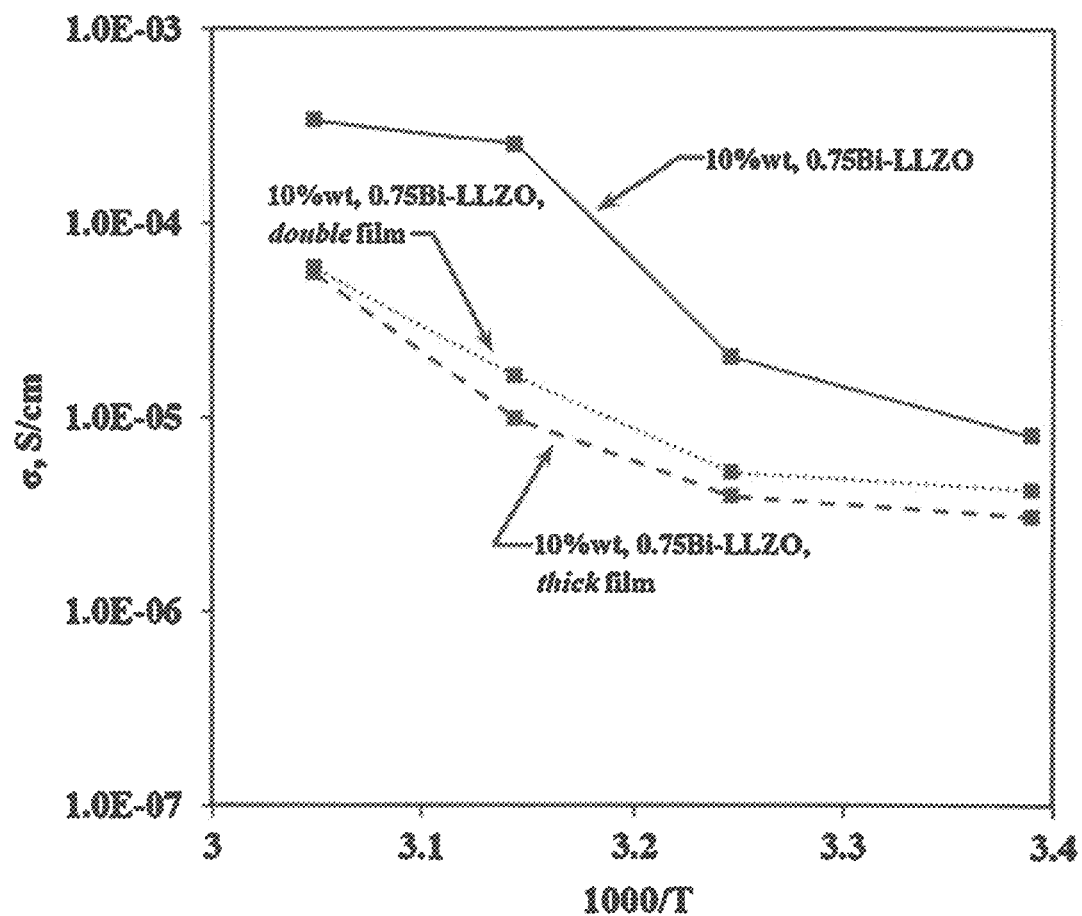
FIG. 15 graphically illustrates Arrhenius plots of ionic conductivity for PCE films loaded with 10% wt 0.75Bi-LLZO.

For the case of the PCE with 10% wt load of filler particles, the higher density of nucleation sites leads to fast spherulite development, allowing little or no spherulite growth from random nucleation sites upon polymer re-solidification. This results in larger average spherulite size and interconnectivity between spherulites nucleated from the filler particles, thereby incrementing the PCE ionic conductivity. Further increments in filler particle weight load, while multiplying the number of spherulites formed, leads to an overall decrease in spherulite size due to volume competition. Furthermore, the density of spherulite domain boundaries is significantly enhanced, resulting in augmented resistance and tortuosity to ionic transport, negatively impacting ionic conductivity. To confirm, ionic transport in PCE of different thicknesses, as well as in dual-layer PCEs, was studied. These PCEs were fabricated by bonding together two thin films by solvent dissolution of their surface boundaries and pressing them together. FIG. 15 shows Arrhenius plots for the ionic conductivity in PCE films of different thicknesses loaded with 10% wt 0.75Bi-LLZO.

The measurements labeled as 10% wt, 0.75Bi-LLZO correspond to a 310 µm thin film, whereas the label 10% wt, 0.75Bi-LLZO thick film correspond to a ~910 µm thick sample. The 10% wt, 0.75Bi-LLZO double film correspond to the two "bonded" films having a total thickness of ~500 µm. The thick and the double layer PCE electrolytes were observed to exhibit lower ionic conductivities compared to the thin counterpart. The decrease in IC for the thick films can be explained by the increased ion pathway tortuosity associated with the larger spherulite volume. In the case of the double film, the lower ionic conductivity is explained by the effect of the added interface and by tortuosity increment brought about by fusing two microstructurally uncorrelated thin films.

Bi-content of the filler particles plays a role in spherulite distribution as the aliovalent substitution of Bi in LLZO alters the Li molar ratio in LLZO. Bi-aliovalent substitution at the Zr-site in LLZO changes the Li molar ratio from Li=7.0 in LLZO to Li=6 and Li=6.25 in Bi-LLZO and 0.75Bi-LLZO garnets respectively, thereby altering the density of Li vacancies. Changes in the Li-vacancy density is suggested to modify the surface charge and chemistry of the filler particles. Said surface particle modifications impact both the Li-salt disassociation reaction and the formation and growth of spherulites in the polymer matrix nucleated at these heterogeneous sites. Changes in particle surface properties determine the weight load needed to form the optimum polymer morphology to facilitate macroscopic ion transport in the PCE.

The resulting changes in filler particle surface charge modify the nucleation rate for spherulite formation at the particle surface. Optimum ionic conductivity in the PCE polymer members is the consequence of the formation of a polymer microstructure comprising a critical density and size of spherulites. The desired microstructure may be achieved via control of the physio-chemical properties of the active filler particles. Further filler particle weight loads result in smaller spherulites, an increase in domain boundaries that drastically increment the amorphous channels' tortuosity, leading to a decrease in ionic conductivity. Bi-LLZO particles act as heterogeneous nucleation sites in the polymer matrix. Based on the particle % wt influence on spherulite formation and growth observed, it is evident that the Bi-doped garnet sites dominate the overall nucleation and growth of spherulites in PCE structures. Balancing the amount of free lithium ions provided by LiTFSI disassociation (and/or Li vacancies in the garnet crystal structure) and the added Bi-doped LLZO particles provides an avenue to control the film morphology for optimum ion transport. Li vacancies alters the particle surface charges and its chemistry and this surface modifications result in three significant consequences: 1) it changes the polymer ether oxygen coordination with the Li-salt, enhancing the rate of Li-ion disassociation in a similar fashion as lithium salt cations; 2) it alters the free volume for PEO chain segmental motion and 3) it changes the rate of nucleation and growth of spherulites in the polymer matrix effected by the added garnet particles. A corollary of the later observation is that a higher density of Li vacancies in the filler particle accelerates spherulite growth and the probability of forming interconnected high ion transport amorphous channels, whereby Bi-LLZO (Li-site occupancy=6.0) provides both higher IC and a lower % wt needed to optimize the PCE ionic conductivity.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A solid-state flexible electrolyte member for a lithium ion electrochemical cell, comprising:
    a flexible thin film substrate portion;
    an ionic salt dissolved into the flexible thin film substrate portion; and
    an aliovalently-doped LLZO (lithium lanthanum zirconium oxide) garnet of formula $Li_{7-x}La_3Zr_{2-x}Bi_xO_{12}$, where x is in the range 0.01 to 1.99;
    wherein the aliovalently-doped LLZO garnet portion is dispersed in the flexible thin film substrate portion to define the solid-state flexible electrolyte member;
    wherein the aliovalently-doped LLZO garnet portion defines a plurality of cubic garnet particles having diameters ranging from 1 nanometer to 500 microns;
    wherein the solid-state flexible electrolyte member has an aliovalently-doped LLZO concentration of between two and a half weight percent and ten weight percent.

2. The solid-state flexible electrolyte member of claim 1, wherein the flexible thin film substrate portion is polyethylene oxide (PEO).

3. The solid-state flexible electrolyte member of claim 1, wherein the solid-state flexible electrolyte member exhibits an ionic conductivity of about of $1.09 \times 10^{-4}$ S/cm at 35° C. and about $5.45 \times 10^{-3}$ S/cm at 55° C.

4. The solid-state flexible electrolyte member of claim 1 wherein the aliovalently-doped lithium lanthanum zirconium oxide portion is selected from the group consisting of $Li_{6.25}La_3Zr_{1.25}Bi_{0.75}O_{12}$ and $Li_6La_3ZrBiO_{12}$.

5. The solid-state flexible electrolyte member of claim 1, wherein the cubic garnet particles are nucleation sites for spherulites.

6. A lithium ion electrochemical cell, comprising:
    a first electrode;
    a second electrode;
    a flexible thin film substrate portion positioned between the first and second electrodes; and
    a plurality of bismuth-doped LLZO garnet meso-particles of formula $Li_{7-x}La_3Zr_{2-x}Bi_xO_{12}$, where x is in the range 0.01 to 1.99 homogeneously dispersed in the flexible thin film substrate portion;
    wherein the first and second electrodes are in ionic communication through the flexible thin film substrate portion; and
    wherein the concentration of the bismuth-doped LLZO garnet material in the flexible thin film portion is between two and a half weight percent and ten weight percent and
    wherein the flexible thin film substrate portion has an ion conductivity of at least $1 \times 10^{-4}$ S/cm at 35° C. and an electrical ion conductivity of at least $5 \times 10^{-3}$ S/cm at 55° C.

7. A flexible solid-state electrolyte comprising particles of a bismuth-doped LLZO garnet of formula $Li_{7-x}La_3Zr_{2-x}Bi_xO_{12}$, where x is in the range 0.01 to 1.99 giving rise to ionic conduction embedded in a polymer matrix containing an ionic salt.

8. The solid-state electrolyte of claim 7, wherein the polymer is PEO and the ionic salt is LiTSFI.

9. The solid-state electrolyte of claim 7, wherein x is 0.75 or 1.0.

10. The solid-state electrolyte of claim 7, wherein the weight load of the bismuth-doped LLZO garnet material is between five weight percent and ten weight percent.

11. The solid-state electrolyte of claim 7, wherein the weight load of the bismuth-doped LLZO garnet material in the flexible thin film portion is between 4.5 and 5.5 weight percent.

12. The solid-state electrolyte of claim 7, wherein the weight ratio of the polymer to the ionic salt in the polymer matrix containing the ionic salt is in the range of 3:1 to 15:1.

13. A method of fabricating a flexible solid-state electrolyte, the method comprising;
    providing particles of LLZO garnet material of formula $Li_{7-x}La_3Zr_{2-x}Bi_xO_{12}$, where x is in the range 0.01 to 1.99;
    mixing the particles of $Li_{7-x}La_3Zr_{2-x}Bi_xO_{12}$, PEO, and ionic salt in a solvent to form a slurry;
    ball milling the slurry to obtain a uniform dispersion of the $Li_{7-x}La_3Zr_{2-x}Bi_xO_{12}$ particles into a matrix made of PEO, resulting in a homogenized slurry;
    casting the homogenized slurry to form a film; and
    drying the film to form a flexible solid-state electrolyte;
    wherein the concentration of the LLZBO is between five weight percent and ten weight percent; and wherein the chemical composition of the $Li_{7-x}La_3Zr_{2-x}Bi_xO_{12}$ particles controls the polymer morphology of the flexible solid-state electrolyte giving rise to ionic conductivity.

14. The method of claim 13, wherein x is in the range of 0.5-1.00.

15. The method of claim 13 wherein x is 0.75 or 1.0.

16. A battery comprising:
 an anode;
 a cathode; and
 a PEO solid-state electrolyte infiltrated with between five and ten weight percent homogeneously distributed $Li_{7-x}La_3Zr_{2-x}Bi_xO_{12}$ particles, wherein x is in the range 0.01-1.99.

17. The battery of claim 16, wherein the $Li_{7-x}La_3Zr_{2-x}Bi_xO_{12}$ particles act as nucleation sites for spherulites.

18. The battery of claim 16, wherein x is in the range 0.5-1.00.

19. The battery of claim 18, wherein x is 1.0.

20. A method of controlling the ionic conductivity of a polymer member, comprising:
 providing a plurality of particles of bismuth-doped garnet;
 dispersing the plurality of particles of bismuth-doped garnet in a PEO matrix to yield the polymer member;
 nucleating spherulites at bismuth-doped garnet particle sites; and
 growing spherulites to a critical density to provide ionic conductivity pathways throughout the polymer member.

21. The method of claim 20 wherein the bismuth-doped garnet has the formula $Li_{7-x}La_3Zr_{2-x}Bi_xO_{12}$, wherein x is in the range 0.01-1.99.

22. The method of claim 21 wherein x is in the range 0.5-1.0.

23. The method of claim 20 wherein increasing the amount of bismuth in the bismuth-doped garnet increases the conductivity of the polymer member by increasing the spherulite density.

* * * * *